FIG-1 FIG-2
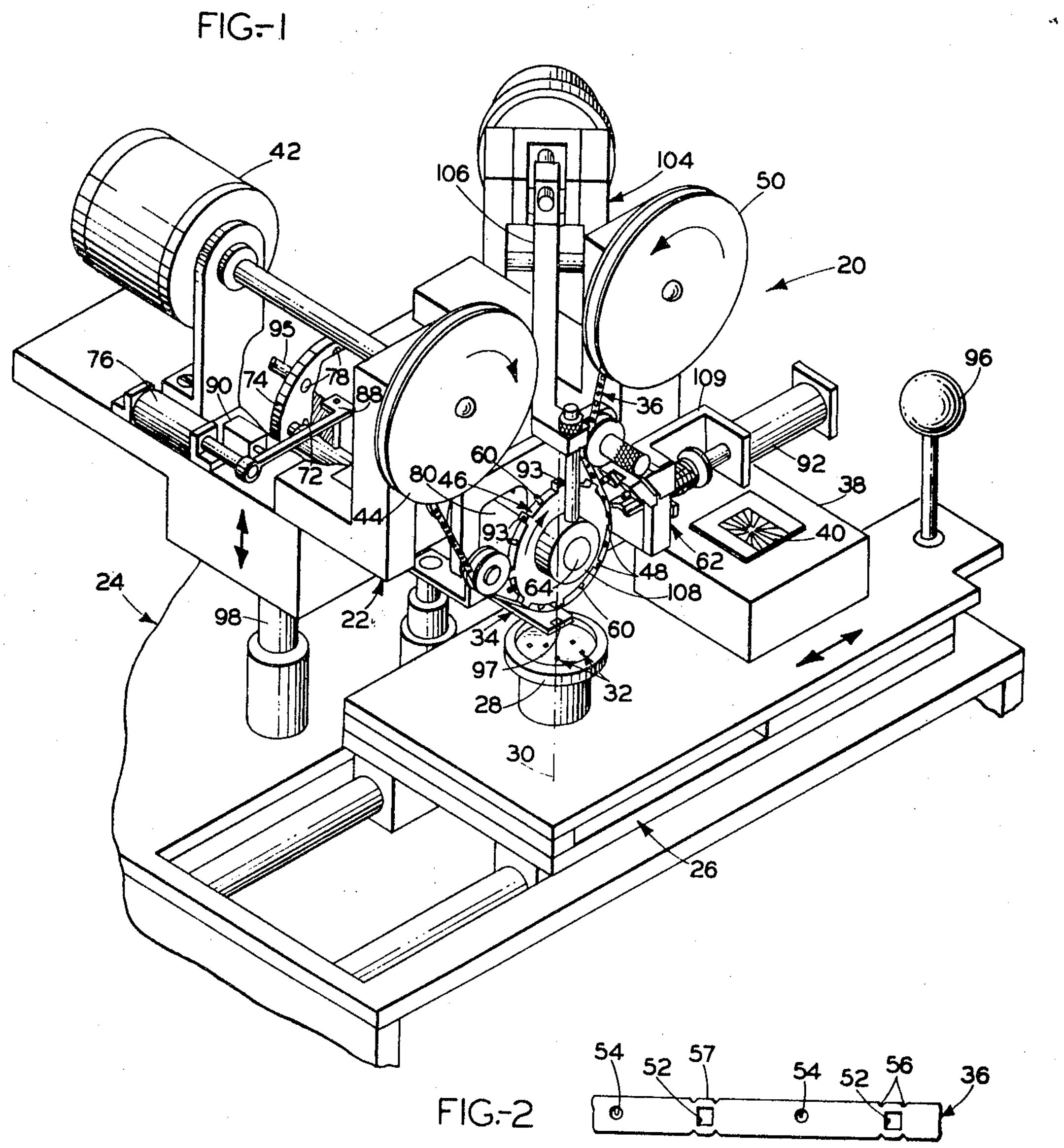
FIG-4
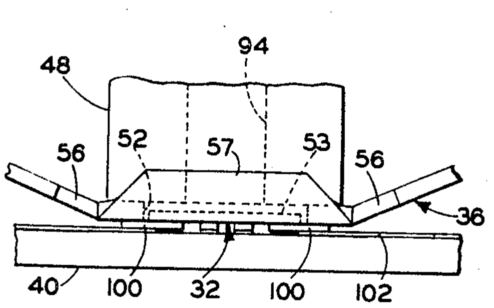
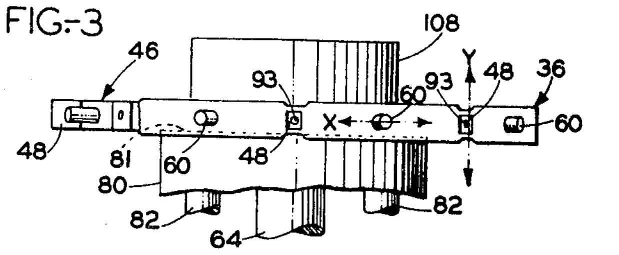

United States Patent Office 3,743,558

Patented July 3, 1973

3,743,558

METHOD OF COMPLIANT BONDING

David P. Ludwig, Whitehall, Pa., assignor to Western Electric Company, Incorporated, New York, N.Y.

Original application Oct. 2, 1969, Ser. No. 863,259, now Patent No. 3,640,444. Divided and this application July 29, 1971, Ser. No. 167,532

Int. Cl. B32b *31/00;* B29c *27/00;* B23k *21/00*

U.S. Cl. 156—73 8 Claims

ABSTRACT OF THE DISCLOSURE

Compliant bonding of beam-lead devices such as integrated circuit chips is accomplished by engaging successive ones of the chips with successive portions of an apertured strip of a compliant bonding medium and bonding the chips to successive portions of substrates. A bonding head travels along a bonding axis both to pick up a chip from a tray and later to bond the chip to a substrate. After each bonding stroke a spent portion of the strip is removed from the bonding axis and a fresh portion is introduced onto the axis for the next bond.

In one illustrative embodiment the bonding head is in the form of a rotatable turret having a number of equally spaced tips projecting radially and outwardly therefrom. The strip is threaded around a portion of the circumference of the turret-like head. After each bond, the head is rotated until a different one of the tips and its associated portion of compliant strip are aligned with the bonding axis. Reels are provided to continuously supply and take-up the strip as progressive rotation of the head occurs. Each bond is thus made with an unspent portion of compliant bonding strip.

This application is a division of application Ser. No. 863,259, filed Oct. 2, 1969, now Pat. No. 3,640,444.

FIELD OF THE INVENTION

This invention relates to methods of compliantly bonding successive workpieces with successive portions of a compliant bonding member. In particular, the invention relates to a system wherein a compliant bonding member may be pre-engaged with a bonding tip and an unspent portion of compliant bonding material can be used for making successive bonds between successive workpieces.

DESCRIPTION OF THE PRIOR ART

When bonding beam-lead transistor and integrated circuit chips to metallic patterns formed on substrates, it is desirable to use a technique known as compliant bonding. Compliant bonding utilizes a deformable compliant member, such as a strip of aluminum, positioned between a rigid heated ram and leads of integrated circuit chips to produce a highly uniform thermocompression bond between the leads and the metallic elements formed on the substrate.

Advantages associated with compliant bonding are quite significant. Some of the advantages are a very uniform distribution of bonding forces over the leads; good control of lateral bonding forces which cause a phenomenon known as "bugging"; and a virtual elimination of situations in which excessive bonding forces are applied to leads that might cause a reduction of lead strength. These and other advantages as well as a very detailed description of compliant bonding can be had by referring to U.S. Pat. No. 3,533,155 issued to A. Coucoulas on Oct. 13, 1970.

Compliant bonding however, in its present state of development, is not free of problems. One of the difficulties in utilizing compliant bonding is that in many circumstances the introduction of a compliant bonding member into a bonding system is often a cumbersome and inefficient segment of a bonding operation. The principal reason for this difficulty is that integrated circuit chips are usually formed of a body portion of crystalline material, such as silicon, which is usually quite brittle. A compliant bonding member cannot be placed directly over these body portions during compliant bonding because the bonding forces transmitted through the compliant bonding member would crack or otherwise damage the brittle body portions. Consequently, compliant bonding members used to bond such brittle chips are provided with apertures large enough so that the body portions of the chips can extend into the apertures during bonding.

Of course, when the chips are bonded to a substrate they must be very accurately located with respect to the metallic patterns on the substrates and, very often, many of the chips are placed on one substrate, thus complicating the placement problems. It has been the practice in the art to create compliant bonding members with a pattern of apertures formed therein that corresponds to the pattern of the chips on the particular substrate to which they are being bonded.

In implementing compliant bonding in situations where accurately located integrated circuit chips are involved, it has been the practice to pre-position or "tack" the chips to the substrate prior to the bonding of the chips. After the chips are tacked, a pre-formed, i.e., an aperturned compliant bonding member is placed over the assembly of substrate and "tacked" chips. A heated ram is then pressed onto the compliant bonding member and all of the chips are simultaneously bonded to the substrate.

Tacking of the chips, forming of the accurately apertured compliant member, and accurately locating the compliant member with respect to the substrate, are costly manufacturing steps and are best avoided, if possible, when efficient manufacturing of electronic components is a goal.

The above-described problems that develop in the use of compliant bonding to bond integrated circuit chips to substrates are eliminated to a certain extent by using bonders which are generically identified as hard-tip bonders. One example of such a bonder is described in U.S. Pat. 3,452,917. Hard-tip bonders as a class are extremely flexible in that they can be used in virtually any kind of bonding operation. However, hard-tip bonders simply do not possess the advantages that are inherent in compliant bonding.

In thermocompression bonding in general, one of the most significant parameters is the so-called interface temperature. The interface temperature is that temperature which develops within the beam leads that are pressed between the compliant member and the substrate in the case of compliant bonding and between a bonding tip and the substrate in the case of hard-tip bonding. It has been found by extensive experience that bonding of beam lead devices by thermocompression techniques is best accomplished with interface temperatures in the range of 240–300° C. It has also been found by experience that in the case of hard-tip bonding, a tip temperature of something less than 370° C., the maximum allowable temperature of the semiconductor chip, is not sufficient to achieve the desirable interface temperature. Thus it has become necessary in hard-tip bonding to either heat the substrate in addition to heating the tip in order to provide sufficient thermal energy to achieve a satisfactory interface temperature or to exert extremely high bonding pressures as a trade-off to achieve the desired interface temperature.

It is particularly important to limit pressure on the substrates and eliminate heating of the substrate in situations where fragile ceramic or glass substrates are used. Such substrates are highly intolerant of heating and excessive pressures. In order to accomplish reliable bonding to these types of substrates, it is extremely desirable to be able to raise the temperature of the bonding tip above 370° C. in order to develop the desirable interface temperature. But, of course, exposure of the chips by contact with a hard-tip at such high temperatures is potentially hazardous to the chips being bonded.

SUMMARY OF THE INVENTION

It is an object of the invention to provide an efficient system for engaging workpieces with a compliant bonding medium in preparation for bonding.

It is another object of the invention to provide a bonding system operable with the flexibility of rigid-tip bonders but with the capability for making successive compliant bonds between workpieces.

It is an additional object of the invention to reliably bond integrated circuits to substrates with a desired interface temperature without the need for heating the substrate.

The foregoing and other objects are accomplished in accordance with the invention by positively engaging a portion of a compliant member with a bonding tip prior to using the tip for bonding. The tip and workpieces to be bonded are aligned and bonding is effected. After bonding the tip and the used portion of the compliant member are removed from the bonded workpieces and the spent portion of the compliant member is replaced on a bonding axis by an unspent portion of compliant material.

Particular examples of apparatus useful for carrying out the invention include rotatable rams having a plurality of tips projecting therefrom. Replacement of the spent compliant material is accomplished by rotating the ram incrementally. The compliant material is engaged with a number of the tips simultaneously and incremental rotation of the ram brings successive ones of the tips and associated portions of the compliant member onto the bonding axis for the bonding of each successive set of workpieces.

DETAILED DESCRIPTION OF THE DRAWINGS

Other objects and features of the present invention will be more readily understood from the following detailed description of a specific embodiment thereof when read in conjunction with the appended drawings in which:

FIG. 1 is a perspective view of a bonding machine by which the inventive method may be practiced and which embodies the inventive apparatus;

FIG. 2 is a portion of a compliant bonding member used in the bonding machine of FIG. 1;

FIG. 3 is a view of the compliant bonding member of FIG. 2 engaged with a rotatable ram of the machine of FIG. 1 looking upwardly from the workpiece;

FIG. 4 is an enlarged view of a bonding tip pressing the compliant bonding member and workpieces together to effect a bond;

DETAILED DESCRIPTION

Figure 5:
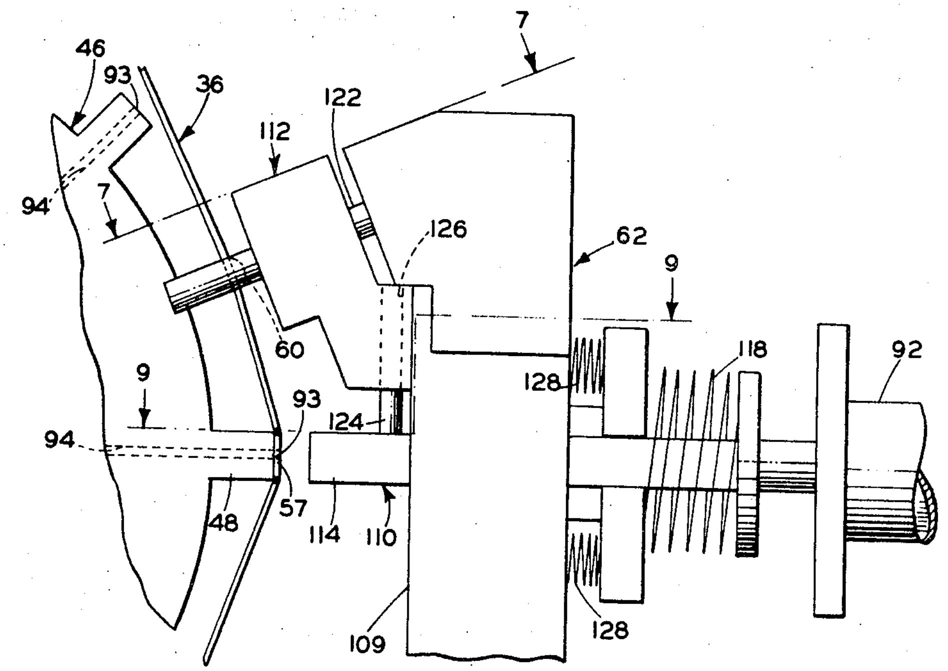
FIG. 5 is a view of an engagement assembly of the machine of FIG. 1 shown in a retracted position.

Illustratively, the invention is described in connection with a turret-like bonding head which is utilized to compliantly bond leads of integrated circuit chips to substrates. However, it is to be understood that this is only for purposes of explanation and that the invention can be embodied in many forms of mechanical arrangements.

Referring now to FIG. 1, there is shown one embodiment of the invention, a bonding machine, designated generally by the numeral 20. The machine 20 includes a bonding head, designated generally by the numeral 22; a support structure, designated generally by the numeral 24; and a conventional positioner assembly, designated generally by the numeral 26.

OVERALL OPERATION

In general, the operation of the machine 20 is as follows. The positioner assembly 26 is moved to one extremity of its range of motion so that a chip tray 28 is located on a bonding axis indicated by the line 30. First workpieces, in this case, beam-lead integrated circuit chips designated generally by the numeral 32 are supported on the chip tray 28. An optical system, designated generally by the numeral 34 is utilized by an operator to simultaneously view one of the chips 32 and a portion of a compliant bonding member, designated generally by the numeral 36.

After one of the chips 32 and the selected portion of the compliant bonding member 36 are appropriately aligned, the optical system 34 swings away from the axis 30, the bonding head 22 is lowered and the aligned chip is engaged against the compliant bonding member 36 and held by a vacuum.

The head 22 is then raised, the optical system 34 swings in and the positioner assembly 26 is moved to its other extremity of motion so that a substrate support 38 is brought onto the axis 30. The operator views the engaged chip 32 and a second workpiece, in this case, a substrate 40 simultaneously through the optical system 34 and manipulates the positioner assembly 26 to align a desired portion of the substrate 40 with the chip 32. After the substrate 40 is properly aligned, the head 22 is lowered and bonding pressure is applied so that the chip 32 is compliantly bonded to the aligned portion of the substrate 40. See FIG. 4.

After bonding is complete, the head 22 is raised and a motor 42 drives a take-up reel 44 through a portion of a revolution. The compliant member 36 is pulled by the rotation of the take-up reel 44 and a bonding ram, designated generally by the numeral 46, which is positively engaged with the compliant bonding member 36, is rotated by the motion of the member. Rotation of the take-up reel continues until a next one of a plurality of bonding tips 48 of the ram 46 is aligned on the bonding axis 30.

A supply reel 50 has an indeterminate length of the compliant bonding member 36 wound thereon so that successive periods of rotation of the take-up reel 44 result in successive portions of the compliant bonding member 36 being fed to successive ones of the bonding tips 48. Thus, an unspent portion of the compliant bonding member 36 is provided for each successive bonding operation that the machine 20 performs.

A more detailed understanding of the structure and operation of the bonding head 22 can be had by referring to remaining figures in conjunction with FIG. 1. FIG. 2 illustrates a portion of the compliant bonding member 36 as it is provided on the supply reel 50. The compliant bonding member 36 may be formed as a progressively punched part from any one of a number of workable materials. Desired characteristics of such materials are defined in the aforementioned Pat. No. 3,533,155. One example of such a material is 2024 Type aluminum strip having a thickness of 0.005 inch.

The compliant bonding member 36 is provided with two types of apertures: bonding apertures 52 and advancement apertures 54. The bonding apertures 52 are rectangularly shaped to accommodate a body portion 53 of one of the chips 32 as shown in FIG. 4. The advancement apertures 54 are round and disposed between each of the bonding apertures 52. The advancement apertures 54 are part of the means by which the bonding ram 46 engages with the member 36 to position the member accurately with respect to the tip 48.

Notches 56 are formed into the edges of the member 36. The notches 56 facilitate bending of the edges of the member 36 around the edges of the tips 48 as shown in FIG. 3.

FIGS. 1, 2 and 3 illustrate the relationship of the member 36 with the bonding ram 46. The tips 48 are narrower than the member 36. The notches 56 are cut just deep enough so that their inner terminations are at the outer edges of the tips 48. The portions of the member 36 between the notches 56 form tabs 57 which can be bent around the edges of the tips 48.

Sprocket projections 60 extending outwardly from the bonding ram 46 are engaged with each of the advancement apertures 54. The combination of angular spacing between the sprocket projections 60 and the linear spacing between the various apertures results in the bonding apertures 52 being centrally located on the bonding tips 48 in the X direction shown on FIG. 3.

Accurate alignment of each of the tips 48 with respect to the bonding axis 30 is extremely important in the operation of the bonding head 22. This accurate alignment is achieved in part by mounting the ram 46 on a shaft 64 which is supported in conventional precision bearings (not shown). Additionally, the rotary motion of the ram 46 is limited to accurately defined 45° steps.

Referring back now to FIGS. 1 through 4, rotation of the ram 46 is caused by force imparted to the ram by the member 36 being wound on the take-up reel 44. The take-up reel is continuously urged to rotate with a substantially constant torque generated by the motor 42, the motor advantageously being of the conventional "torque-motor" design, i.e., a motor which is designed to permit full current in its windings under stalled condition. When operated in this way the motor 42 will constantly take up slack in the member 36 when it develops and will stall when the member is taut. Thus an actual rotation of the take-up reel 44 only occurs when the ram 46 is released from one of its eight aligned bonding positions.

If the member 36 is particularly fragile the ram 46 can be driven directly and the motor 42 can be used to simply take up slack.

Positive location in the Y direction, shown in FIG. 3, is provided by the folding over of the tabs 57 of the member 36 around the edges of the tip 48. The folded tabs 57 hold the member 36 in position very positively.

The combination of the folded tabs 57 and the engaged advancement apertures 54 assures that each of the bonding apertures is positively located on the bonding axis 30 during the bonding cycle.

Figure 6:
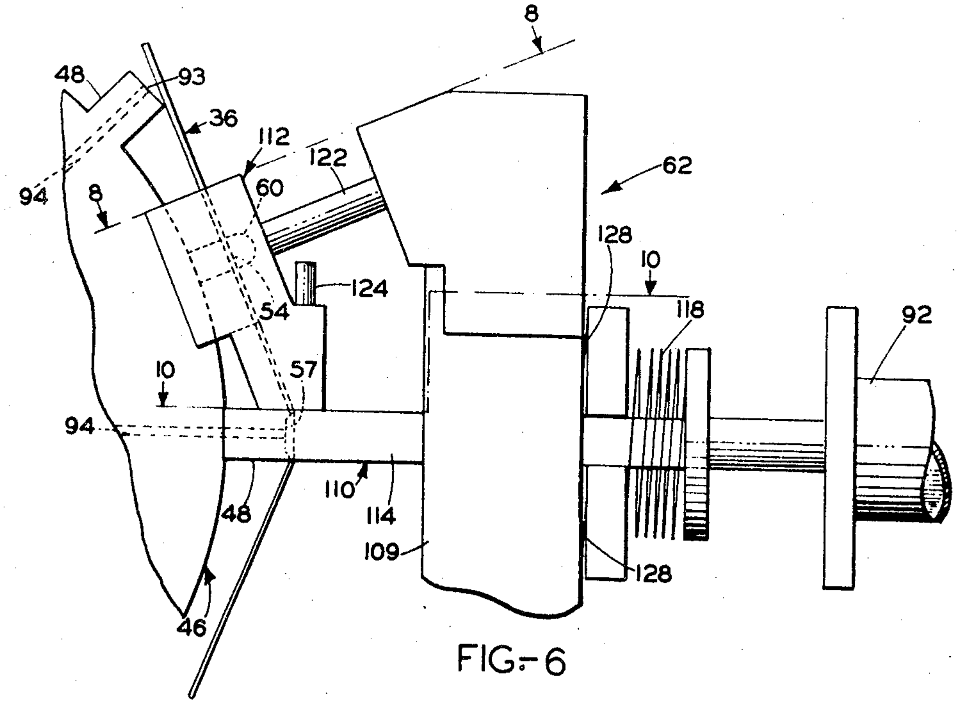
FIG. 6 is an illustration of the engagement assembly of FIG. 5 shown in an engaged position.
Figure 7:
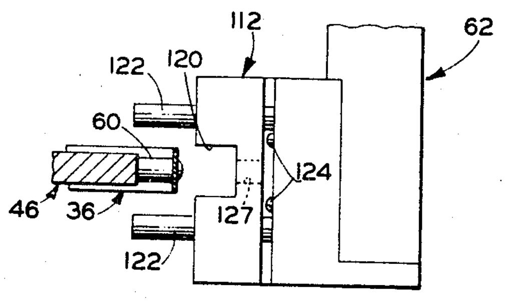
FIG. 7 is a sectional view of the engagement assembly of FIG. 5 taken along the lines 7—7.

The bonding ram 46 is provided with eight of the bonding tips 48 spaced at 45° from each other. As shown in FIGS. 5 and 6, each successive portion of the bonding member 36 becomes engaged with an associated one of the bonding tips 48 when the tip is in the 3 o'clock position. An engaging assembly, designated generally by the numeral 62, moves inwardly at the end of each period of rotation of the take-up reel 44 and forces the tabs 57 around the edges of the tip 48. Additionally, the engagement assembly 62 presses the portion of the member surrounding one of the advancement apertures 54 onto one of the sprocket projections 60. Thus, when the tip 48, which is in the 3 o'clock position, is finally indexed to a position on the bonding axis 30, the member 36 is positively engaged with the tip and accurately located with respect to the tip.

The ram 46 becomes free to rotate when an index pin 72 is momentarily urged out of engagement with an index plate 74. Such release is provided by momentarily applying pressured air to a conventional spring-biased cylinder 76 to urge the pin 72 away from the plate 74. The index plate 74 is provided with eight accurately machined holes 78 that corresponds in angular displacement precisely to the centers of the tips 48.

After the pin 72 is released from one of the holes 78, the ram 46 begins to rotate due to the force exerted thereon by the member 36. The plate 74 is rigidly connected to the shaft 64 so that the plate rotates at the same angular velocity as the ram 46. Since the air cylinder 76 is operated only momentarily, the pin 72 soon becomes urged against the plate 74 by the force of the spring in the cylinder. When a successive one of the holes 78 moves into alignment with the pin 72, the pin snaps into the hole and rotation of the ram 46 stops.

The ram 46 is heated by contact with a heater collar 80 which is spring-biased against the ram at an interface 81. The collar 80 is maintained at a desired temperature with conventional cartridge heaters 82.

The head 22 is constructed to permit application of vacuum at each of eight vacuum ports 93 formed in the end of each of the tips 48. The ports 93 are connected by radial passageways 94 to a central passageway (not shown) which runs through the length of the shaft 64. A vacuum source (not shown) is connected to the shaft 64 with a conventional connector 95. Selective actuation of the vacuum source applies vacuum at each of the ports 93. If it is desired to limit vacuum application to selected ones of the ports 93 a sleeve having a desired hole pattern can be inserted into the shaft 64.

A switch 90 is actuated by a cam 88 connected to the index pin 72 when the index pin snaps into one of the holes 78 in the plate 74. The switch is connected to actuate a value (not shown) which admits air to a cylinder 92 that operates the engagement assembly 62.

It should be noted that even though a particular portion of one side of the member 36 cannot be re-used in bonding, it is possible to use the opposite side of the member to make satisfactory compliant bonds. After the inventive machine 20 is used to make a series of compliant bonds using a full package on the supply reel 50, the take-up reel 44 can be used as a supply and the opposite side of the compliant member can be used to make another series of compliant bonds. Thus, a full utilization of the member 36 can be realized.

DETAILED OPERATION

A full understanding of the operation of the machine can be had by reviewing one full cycle of its operation in detail.

A cycle of operation can be considered to begin with the machine in the configuration shown in FIG. 1. The bonding head 22 is in a raised position and the positioner assembly 26 is located so that the chip tray 28 is on the bonding axis 30. The positioner assembly 26 can be precisely moved by an operator through the use of a manipulator handle 96. Use of the positioner assembly 26 permits alignment of any one of the chips 32 on the tray with the bonding aperture 52 in the portion of the compliant member 36, which is engaged with the tip 48 in the 6 o'clock position.

The chip 32 and the aperture 52 can be viewed simultaneously by an operator though the optical system 34. The optical system 34 includes a conventional beam splitter 97 which simultaneously projects an image of the aperture 52 at the 6 o'clock position, and the chip 32, which is on the bonding axis 30. The images of both the chip 32 and the member 36 are viewed through a conventional microscope, not shown, which is focused on the beam splitter 97.

An operator, while viewing the chip 32 and the aperture 52 on the bonding axis 30, adjusts the position of the chip with respect to the bonding axis 30 by shifting the positioner assembly 26 with the handle 96, as necessary. After alignment is achieved, the optical system 34 swings away to leave a clear path between the head 22 and the chip tray 28. With the optical system 34 removed, the bonding head 22 is lowered under the control of the operator. The entire bonding head 22 rides on slide assemblies 98 as it is lowered and raised.

When the portion of compliant member 36 in the 6 o'clock position contacts the chip 32 which is on the bonding axis 30, vacuum is applied through the connection 95. The vacuum creates a force in the vacuum port 93 in the 6 o'clock position to lift the chip 32 into positive engagement with the member 36, the head 22 is again raised to the position shown in FIG. 1.

An operator then slides the positioner assembly 26 to the left so that the substrate support 38 is on the bonding axis 30. The optical system 34 is again brought on the bonding axis 30 so that an operator can simultaneously view the engaged chip 32 and the substrate 40. The manipulator handle 96 is again used to locate the substrate 40 accurately with respect to the engaged chip 32. After proper alignment is achieved, the optical system 34 is rotated away from the bonding axis 30 so that a clear path is again available between the head 22 and, in this case, the substrate support 38.

The head 22 is again lowered until beam leads 100 of the chip 32 are in contact with a conductive element 102 of the substrate 40, as shown in FIG. 4. After initial contact between the beam leads 100 and the conductive elements 102, a bonding force is applied to the head 22 by operation of a diaphragm assembly, designated generally by the numeral 104. The diaphragm assembly uses accurately controlled air pressure to actuate a lever arm 106. The lever arm 106 is constructed to apply the bonding force to a hub 108 of the ram 46. Application of the bonding force to the hub 108 is desirable because the force acts almost directly along the bonding axis 30. Application of bonding force close to the bonding axis 30 has the advantage of reducing mechanical deflections within the head 22 and the reduction of mechanical deflections contributes to more accurate positioning of the chip 32 on the substrate 40 and to more uniformly of bonding.

After the bonding is achieved between the leads 100 and the conductive elements 102, the head 22 is again raised to the position shown in FIG. 1. The lever arm is spring biased in the raised position shown in FIG. 1 such that a small clearance exists between the hub 108 and the lever arm 106. This eliminates contact drag which would result in undesirable additional strain to the compliant member 36 during rotation of the ram 46.

The cylinder 76 releases the pin 72 from the hole 78 with which it was engaged. The motor 42 then becomes free to drive the reel 44 which, of course, pulls the compliant member 36. The member 36 because it is positively engaged with the ram 46, rotates the ram. The reel 50 is provided with a conventional drag brake (not shown) so that the member 36 can be provided with a controlled tension therein. Rotation continues until the pin 72 snaps into the next one of the holes 78. At this time, another one of the tips 48 is on the bonding axis 30 in the 6 o'clock position.

Movement of the pin 72 into engagement with the hole 78 actuates the switch 90, which in turn operates the cylinder 92 causing the engagement assembly 62 to perform its function of positively engaging a portion of the compliant member 36 with the ram 46 at the 3 o'clock position.

A detailed description of the operation of the engagement assembly can be had by referring to FIGS. 5 through 11. The engagement assembly 62, mounted on a bracket 109, includes a tip engagement unit designated generally by the numeral 110 and a sprocket-projection engagement member designaetd generally by the numeral 112. Actuation of the cylinder 92 causes the tip engagement unit 110 to move inwardly to the tip 48 which is in the 3 o'clock position.

The tip engagement unit 110 includes two side members 114 and a center member 116. The center member 116 is adapted to move longitudinally with respect to the side members 114 against a biasing spring 118.

Figure 9:
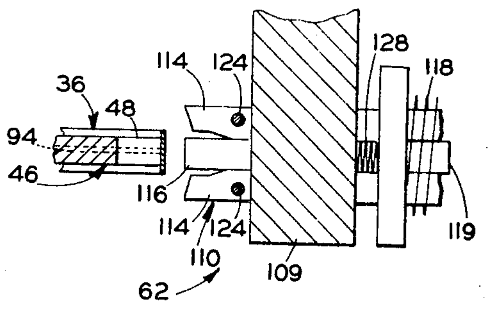
FIG. 9 is a sectional view of the assembly of FIG. 5 taken along the lines 9—9.

FIG. 9 illustrates the unit 110 fully retracted. In this case, the extremities of both the side members 114 and the center member 116 are substantially equidistant from the tip 48.

Figure 11:
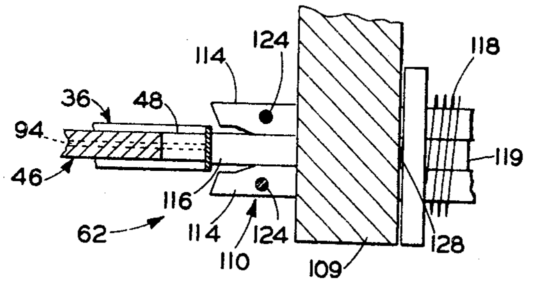
FIG. 11 is a representation of the components illustrated in FIGS. 9 and 10 with the view illustrating the assembly in an intermediate engagement position, the position being intermediate that illustrated in FIG. 5 and that illustrated in FIG. 6.
Figure 8:
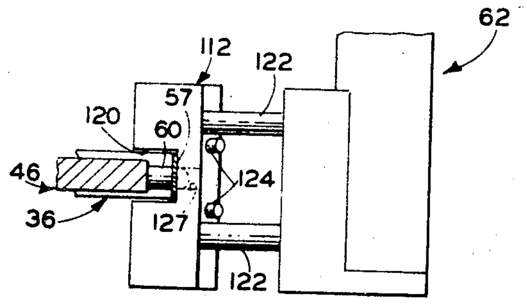
FIG. 8 is a sectional view of the assembly as illustrated in FIG. 6 taken along the lines 8—8.
Figure 10:
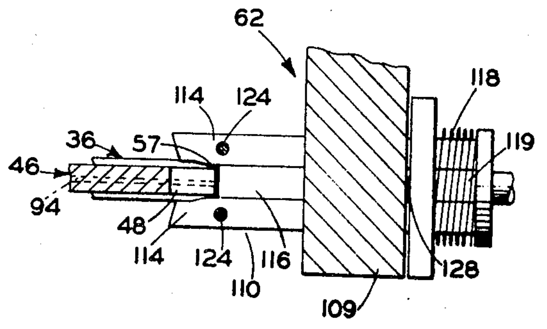
FIG. 10 is a sectional view of the assembly as shown in FIG. 6 taken along the lines 10—10.

FIG. 11 shows the situation in which the unit 110 begins its engagement function. The center member 116 is urging the compliant member 36 against the tip 48 but the spring 118 is still elongated. As motion of the tip engagement unit 110 continues, the center member 116 is stopped but the side members 114 continue to move. As the side members move, they engage with the tabs 57 of the compliant member 36 that overhang the tip 48 and force those tabs over the edges of the tip (FIG. 10). A spacer 119 limits the travel of the side members 114 and transmits the force of the cylinder 92 to the center member 116. Each of the side members is provided with a shaped opening which facilitates sliding engagement with the tabs 57.

Simultaneously with the inward motion of the tip engagement unit 110, the sprocket-projection engagement member 112 presses a portion of the compliant member 36 having one of the advancement apertures 54 therein into positive engagement with one of the sprocket projections 60. The member 112 is formed of a block of plastic material such as tetrafluorethylene which has a channel 120 cut into one side thereof. The channel 120 is just wide enough to accommodate the width of the compliant member 36.

The member 112 rides on two support pins 122. Camming pins 124 project upwardly from each of the side members 114. Camming apertures 126 are formed in the member 112 and are engaged with the pins 124. As the side members 114 move horizontally, the pins 124 transmit a horizontal force component to the member 112. The support pins 122 are mounted at the same angle with respect to the bonding axis 30 that the sprocket projection 60 assumes when the engagement assembly 62 is in operation. Thus a horizontal force component exerted on the member 112 causes the member to follow a path which is parallel to the sprocket projection 60 with which it is to engage. The member 112 moves far enough down on the sprocket projection 60 to assure that the advancement aperture is completely engaged with the sprocket projection. But the motion of the member 112 is limited by the spacer 119 so that the compliant member 36 assumes a final position which is substantially chordal. Excessive inward motion of the member 112 would cause an undesirable concavity resulting from overdeflection in the compliant member 36. A clearance hole 127 permits the projection 60 to intermesh with the member 112.

Return of the cylinder 92 permits both the tip engagement unit 110 and the member 112 to return to their retracted position under the force of springs 118 and 128. When the engagement assembly 62 is in its retracted position the ram 46 can rotate free of any interference from the assembly.

The operation of the inventive machine 20 has been described in a situation wherein individual integrated circuit chips 32 are engaged with the compliant member 36 immediately preceding their being bonded to the substrate 40. It is important to recognize however, that the chips 32 can be incorporated with the member 36 prior to the member being placed on the supply reel 50. Incorporation of this type is described in the aforementioned application for patent Ser. No. 651,411. If this were the case, each rotational step of the ram 46 would result in one of the chips 32 being in position for bonding and only alignment between the chip and the substrate 40 would be required.

Engaging the compliant bonding member 36 with the tip 48 prior to the pickup of one of the chips 32 provides an additional advantage in bonding the chips. The compliant member 36 positioned between the chip 32 and the tip 48 provides a heat transfer mechanism that operates to maintain the chip temperature lower than the temperature of the tip. It is desirable to maintain the temperature of the tip 48 as high as possible. However, chip temperatures that exceed 370° C. are detrimental to the chips 32.

In thermocompression bonding in general, one of the most significant parameters is the so-called interface temperature. The interface temperature is that temperature which develops within the beam leads that are pressed between the compliant member and the substrate in the case of compliant bonding and between a bonding tip and the substrate in the case of hard-tip bonding. It has been found by extensive experience that bonding of beam lead devices by thermocompression techniques is best accomplished with interface temperatures in the range of 240–300° C. It has also been found by experience that in the case of hard-tip bonding, a tip temperature of something less than 370° C., the maximum allowable temperature of the semiconductor chip, is not sufficient to achieve the desirable interface temperature. Thus, it has become necessary in rigid-tip bonding to either heat the substrate in addition to heating the tip in order to provide sufficient thermal energy to achieve a satisfactory interface temperature or to exert extremely high bonding pressures as a trade-off to achieve the desired interface temperature.

With the use of the inventive combination of the compliant member 36 engaged with the tip 48, it is possible to raise the tip temperature higher than 370° C. Because the compliant member 36 acts as a heat transfer medium, the temperature of the chip 32 stays below the critical 370° C. limit. When the tip 48 is pressed down into engagement with the substrate 40 with the compliant member 36 therebetween, the desired interface temperature can be achieved without any additional heating of the substrate 40 and the bonding pressure stays within the limits inherent with compliant bonding.

It is particularly advantageous to utilize the inventive system in situations where ceramic or glass substrates are used which are subject to thermal shock damage. Such substrates are highly intolerant of heating and excessive pressures. In order to accomplish reliable bonding to these types of substrates, it is extremely desirable to be able to raise the temperature of bonding tip above 370° C. in order to develop the desired interface temperature. The heat transferring capability of the compliant member 36 engaged with the tip 48 provides this capability within the bonding machine 20.

It can also be seen that problems associated with bonding of closely spaced multiple chips on a substrate with a compliant strip are reduced by forming the tabs 57 in the compliant member 36 and bending the tabs around the edges of the tips 48. The compliant member shown in FIG. 2 can be readily formed in a conventional punching operation, because a substantial amount of material, over 0.015 inch, is left remaining between the bonding aperture 52 and the outer edges of the compliant strip 36. However, the presence of the substantial amount of material does not preclude the use of the member 36 in situations where a multiplicity of the chips 32 are closely spaced on one of the substrates. Formation of the tabs 57 and bending the tabs around the tip 48 virtually eliminates interfering overhanging portions of the member 36 and it can thus be used in close bonding situations.

Even though the inventive machine 20 has been described in connection with bonding singular chips in discrete steps, it should be recognized that the machine is flexible enough to permit bonding more than one chip per bond cycle.This can be accomplished by providing tips which accommodate portions of compliant members having more than one bonding aperture. These multiple apertures can be engaged with a multiplicity of chips and all of the engaged chips can be bonded simultaneously in a single stroke of a bonding head.

What is claimed is:

1. A method of compliantly bonding successive first workpieces to second workpieces, which comprises the steps of:

engaging only a portion of a member of compliant bonding material with a bonding tip prior to use of the portion in effecting bonding between workpieces;

aligning one of the first workpieces and a desired portion of one of the second workpieces to a bonding axis;

moving the bonding tip and the engaged compliant member portion along the bonding axis to press said engaged portion, the first workpiece and the second workpiece together to effect bonding between the workpieces; and replacing, on the bonding axis, the spent engaged portion of the compliant member with a successive portion of the member so that successive workpiece can be bonded with an unspent portion of compliant material.

2. The method of bonding of claim 1, wherein the bonding tip is one of a plurality of bonding tips mounted on a rotatable ram, wherein the compliant member is engaged simultaneously with a number of the tips, and wherein the step of replacing the spent portion of the member is accomplished by rotating the ram to bring a successive one of the tips and the associated portion of compliant member onto the bonding axis.

3. The method of compliant bonding of claim 1, wherein one of the first workpieces is engaged with the engaged portion of the compliant member prior to use of said engaged portion in effecting bonding between workpieces.

4. The method of bonding of claim 3, wherein the bonding tip is one of a plurality of bonding tips mounted on a rotatable ram, wherein the compliant member is engaged simultaneously with a number of the tips, and wherein the step of replacing the spent portion of the member is accomplished by rotating the ram to bring a successive one of the tips and its associated portion of the compliant member onto the bonding axis.

5. A method of compliantly bonding a first workpiece to a second workpiece, which comprises the steps of:

engaging a compliant bonding material with a bonding tip;

folding said material about said tip to assist in maintaining said engaged material stationary with respect to said tip;

overlapping said workpieces; and pressing said material against said overlapped workpieces to bond them together.

6. A method of compliantly bonding a first workpiece to a second workpiece, which comprises the step of:

engaging a first side of a member of compliant bonding material with a bonding tip;

pressing said member against overlapped ones of the first and second workpieces to effect a bond therebetween;

engaging a second side of said member, opposite said first side, with a bonding tip; and pressing said second side of said member against other ones of the first and second workpieces to effect a bond therebetween, whereby said member is fully utilized.

7. A method of compliantly bonding successive first workpieces to second workpieces, which comprises the steps of:

engaging a portion of a member of compliant bonding material with a bonding tip including folding portions of the edges of the member around edges of the tip to effect positive positioning of the engaged portion on the tip;

aligning one of the first workpieces and a desired portion of one of the second workpieces to a bonding axis;

moving the bonding tip along the bonding axis to press the engaged portion of the compliant member, the first workpiece and the second workpieces together to effect bonding between the workpieces; and replacing on the bonding axis, the spent engaged portion of the compliant member with a successive portion of the member so that successive workpieces can be bonded with an unspent portion of compliant material.

8. A method of compliantly bonding successive first workpieces to second workpieces, which comprises the steps of:

engaging a portion of a member of compliant bonding material with a bonding tip including folding portions of the edges of the member around edges of the tip to effect positive positioning of the engaged portion on the tip;

engaging one of the first workpieces with the engaged portion of the compliant member;

aligning the engaged workpiece of a desired portion of one of the second workpieces to a bonding axis;

moving the bonding tip along the bonding axis to press the engaged portion of the compliant member, the firist workpiece and the second workpieces together to effect bonding between the workpieces; and replacing, on the bonding axis, the spent engaged portion of the compliant member with a successive portion of the member so that successive workpieces can be bonded with an unspent portion of compliant material.

References Cited

UNITED STATES PATENTS

| | | | |
|---|---|---|---|
| 3,272,682 | 9/1966 | Balamuth et al. ---- | 156—580 |
| 3,533,155 | 10/1970 | Coucoulas --------- | 29—471.1 |
| 3,627,190 | 12/1971 | Ramsey -------------- | 228—4 |

ALFRED L. LEAVITT, Primary Examiner

R. A. DAWSON, Assistant Examiner

U.S. Cl. X.R.

29—203 P, 471.1, 497.5; 156—358, 552, 580; 219—78, 117 R